Figure 1:
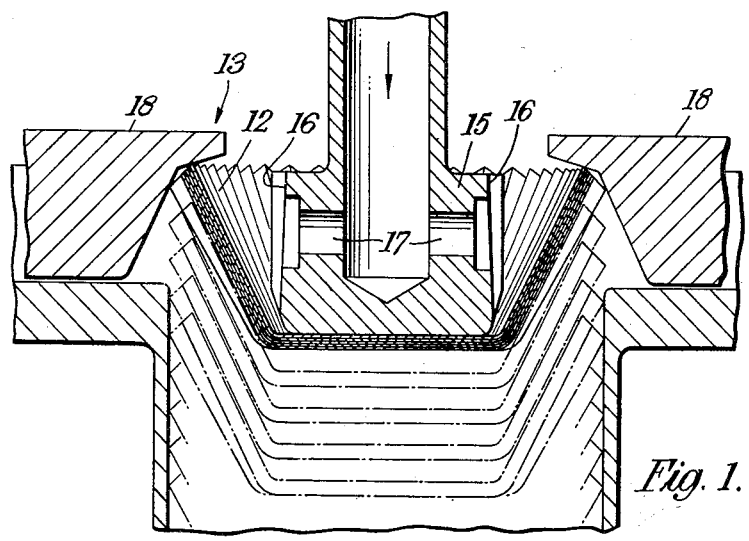

May 21, 1963   P. J. PACKMAN   3,090,523
CUP SEPARATORS

Filed March 9, 1961   6 Sheets-Sheet 1

INVENTOR
Percival J. Packman

Watson, Cole, Grindle & Watson
ATTORNEYS

INVENTOR
Percival J. Packman

Watson, Cole, Grindle & Watson
ATTORNEYS

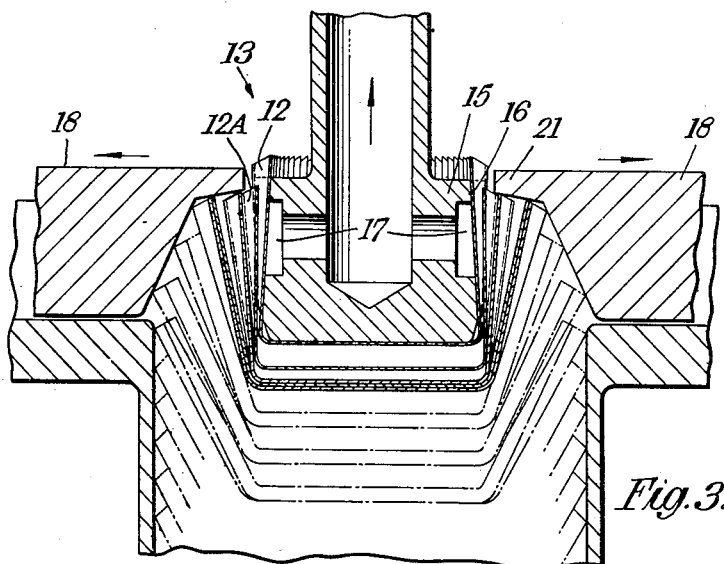
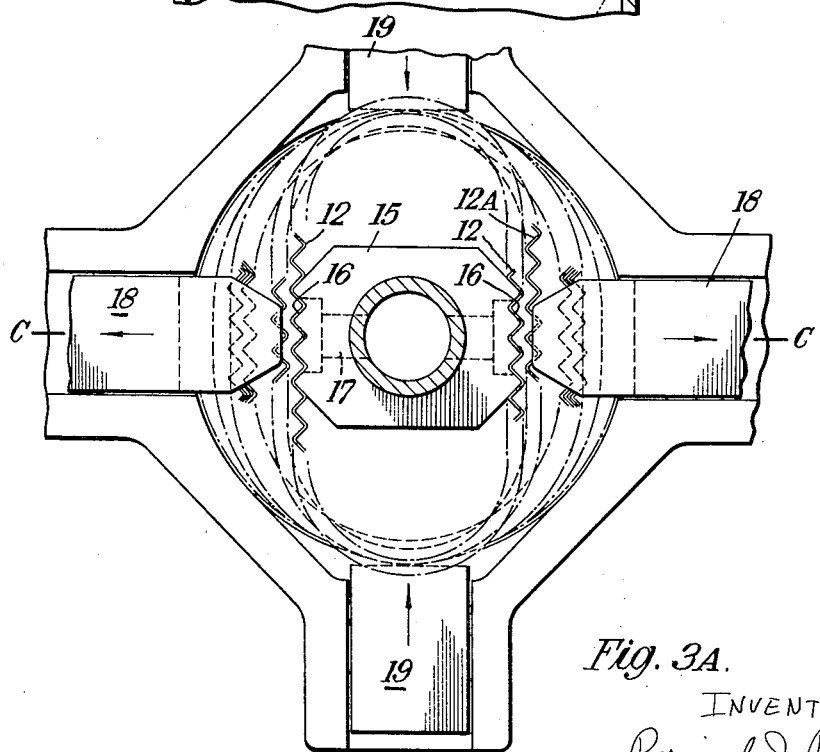

May 21, 1963     P. J. PACKMAN     3,090,523
CUP SEPARATORS

Filed March 9, 1961     6 Sheets-Sheet 4

INVENTOR
Percival J. Packman

Watson, Cole, Grindle + Watson
ATTORNEYS

United States Patent Office 3,090,523
Patented May 21, 1963

3,090,523
CUP SEPARATORS
Percival James Packman, Twyford, England, assignor to Packman Machinery Limited, Twyford, England, a company of Great Britain
Filed Mar. 9, 1961, Ser. No. 94,511
2 Claims. (Cl. 221—36)

Chocolates, sweets, biscuits and other commodities are frequently packed in individual pleated cups, usually made of glassine paper, preparatory to boxing. The cups are of frusto-conical form and have pleated or corrugated walls so that they tend to retain their shape. Such cups are supplied by the manufacturer in compact nests, each consisting of some thirty cups. It is a difficult matter to remove the cups individually from such a nest because, as the result of the process of manufacture of the nest, the corrugations on adjacent cups tend to interlock. The object of the invention is to overcome this difficulty.

The invention provides apparatus for extracting individually and in succession pleated cups from a nest of such cups, comprising a holder for the nest of cups, a suction head, means for moving the suction head into and out of the nest, the suction head having at least two side faces formed with suction orifices, jaws positioned opposite the suction orifices, means for moving the jaws inwardly, while the suction head is in the nest, to deform the cups and bring the wall of the innermost cup into contact with the walls of the suction head containing the suction orifices and thereafter moving the jaws outwardly again to permit the cups surrounding the innermost cup to resume their normal shape, leaving the innermost cup held by suction to the suction head for withdrawal thereby.

Preferably the jaws have lips which project over the cups immediately surrounding the innermost cup during movement of the suction head out of the nest to prevent removal of said surrounding cups by the suction head.

Preferably the suction head has two parallel opposite side faces formed with suction orifices and the jaws are arranged to deform the cups temporarily to an oval shape as they move inwards. If desired, however, the suction head may have more than two equally spaced suction faces, provided always that there is space available for sufficient deformation of the cups by the jaws to ensure that the innermost cup only will adhere to the suction head when the jaws are reopened to permit the remaining cups to resume their normal shape.

In the preferred construction according to the invention I use a suction head which has two parallel suction side faces and which can easily be entered into a cup, the distance across the faces being slightly less than the diameter of the base of the cup. The two faces are indented to conform with the corrugations of the cup and in each face there is a suction orifice. The cups are held in a nest in a magazine which is provided at its outlet end with two jaws capable of closing against the outside of the nest, thereby distorting the cup shape from a circle to an oval. When the suction head is brought to the working position inside the innermost cup, the jaws are closed to force the walls of the cups against the suction faces and the vacuum secures the innermost cup to the suction head, while the remainder of the cups in the nest are allowed to return to their circular shape, when the jaws are opened again. The suction head then moves away from the cups carrying a single cup with it and leaving the remainder of the cups behind.

The apparatus may include two pressure bars set at 90° around the nest in relation to the jaws and arranged to move out as the jaws move in and to move in as the jaws move out. The pressure bars may be positively actuated in timed relation with the jaws or they may be resilient and moved outwardly by the cups as they are deformed by the inward movement of the jaws.

Figure 1A:
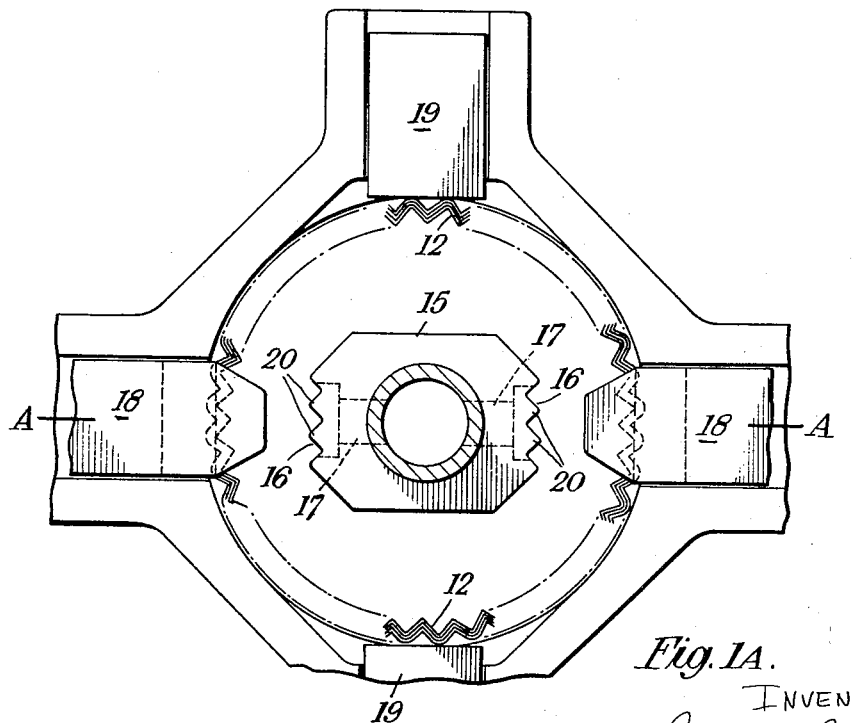
Figure 2:
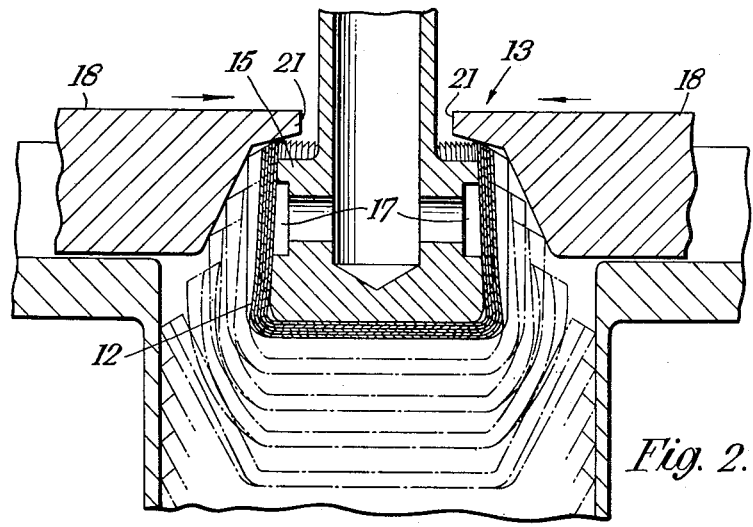
Figure 2A:
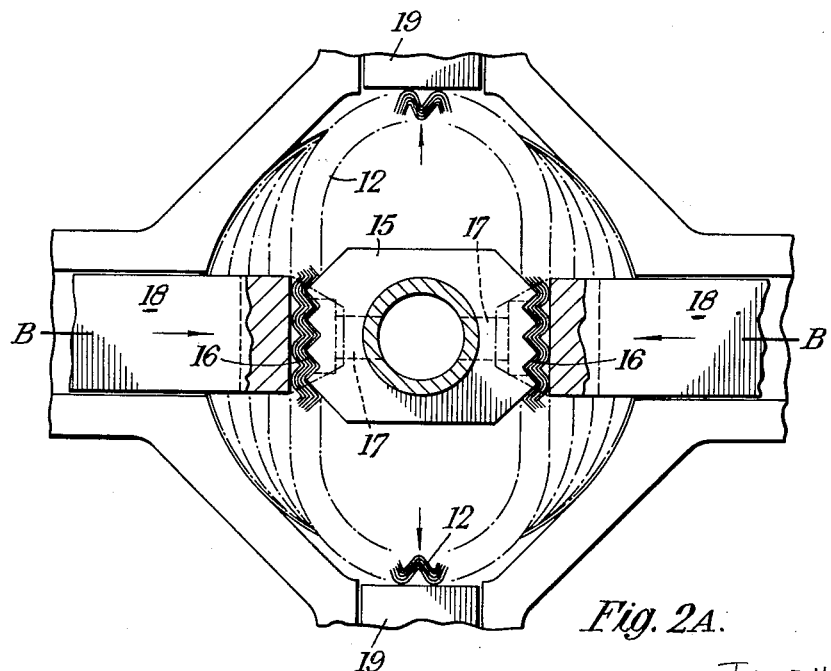
Figure 4:
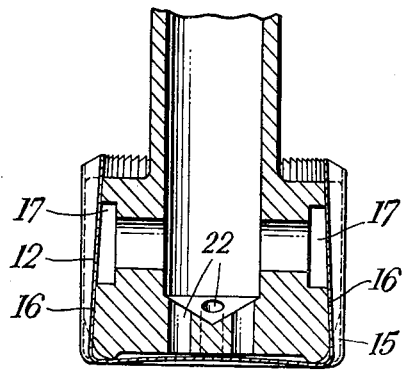
Figure 5:
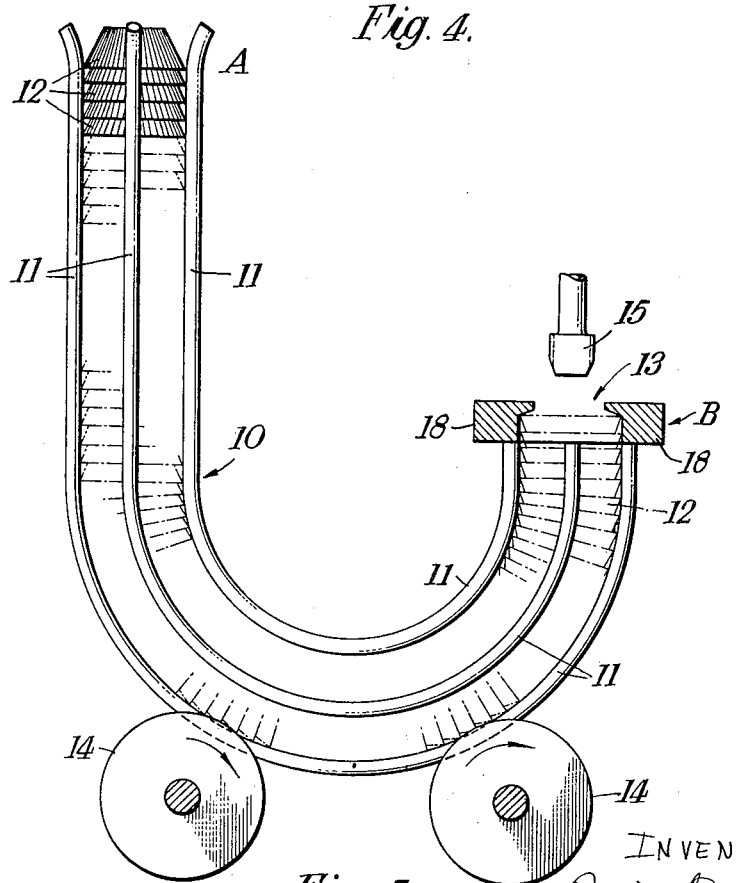
Figure 6:
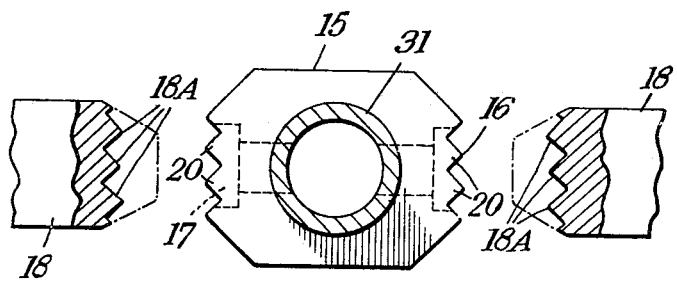
Figure 8:
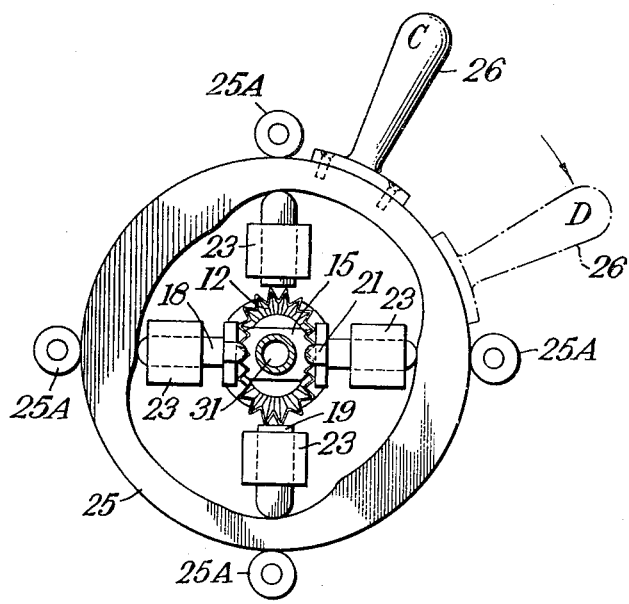
Figure 7:
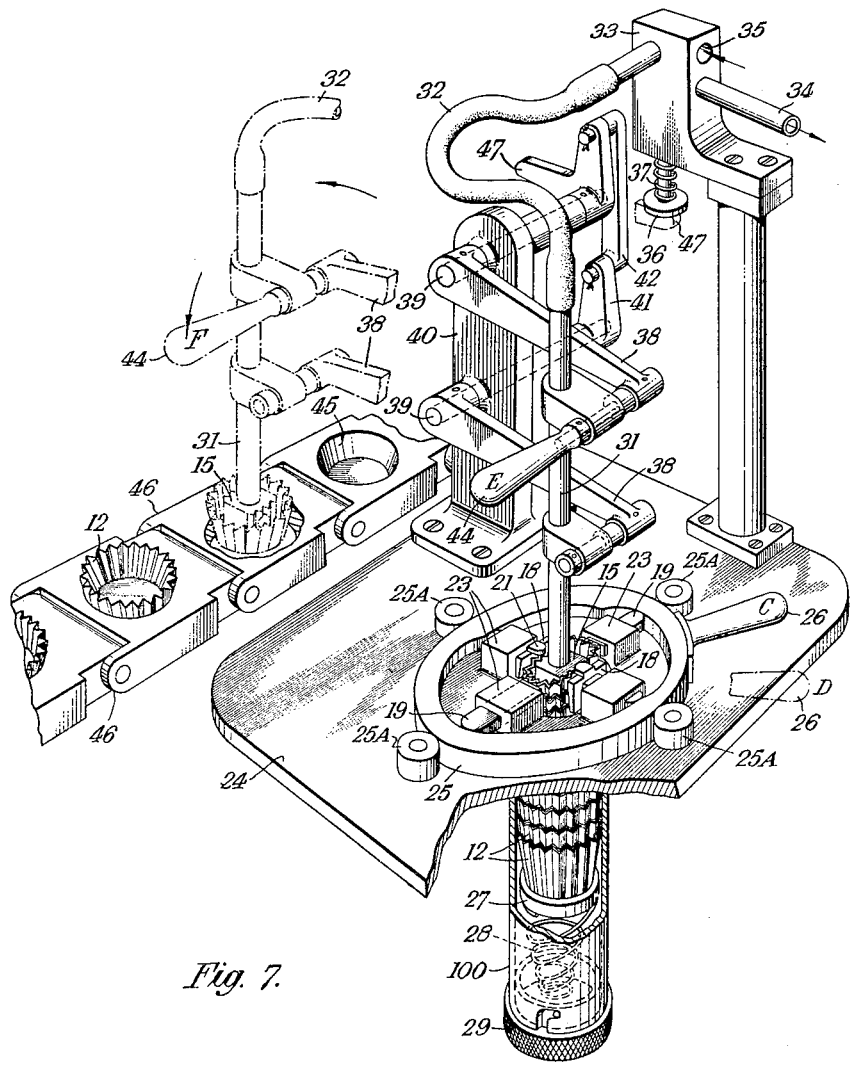

The invention will now be described in more detail, by way of example, with reference to the drawings in which:

FIGS. 1, 2 and 3, which are respectively sections on the lines A—A, B—B and C—C in FIGS. 1A, 2A and 3A, are diagrammatic sectional views of one form of apparatus according to the invention showing successive stages in the extraction of a cup from a nest, FIGS. 1A, 2A and 3A are corresponding plan views, FIG. 4 is a sectional view of a modified form of suction head, FIG. 5 is a view on a smaller scale of a magazine by means of which the nests of cups are supplied to the extraction station, FIG. 6 is a detailed view showing jaws of modified form, FIG. 7 is a perspective view showing a practical form of apparatus according to the invention, and FIG. 8 is a plan view looking downwardly into the magazine.

Like reference numerals indicate like parts throughout the figures.

The magazine 10 shown in FIG. 5 is U-shaped and defined by a number of spaced rods 11 bent to U-formation. Inverted nests of corrugated glassine cups 12 are fed into the magazine by the operator at station A and are delivered by the magazine to an outlet 13 located at an extraction station B. The cups may be delivered by gravity from station A to station B, but mechanical means may be provided to assist the transfer, such as the friction wheels 14 shown in FIG. 5. Toothed wheels or belts can be used in place of the friction wheels.

The tubular suction head 15 has two opposite and parallel side faces 16 in which are formed suction orifices 17 communicating with the interior of the suction head. The holder 13 includes a pair of opposed jaws 18 situated opposite the suction faces 16 and a pair of pressure bars 19 spaced at 90° from the jaws 18.

After the suction head 15 has descended into contact with the base of the innermost cup 12 in the nest, as shown in FIGS. 1 and 1A, the jaws 18 are moved inwards as shown in FIGS. 2 and 2A. At the same time the pressure bars 19 are moved outwards. The pressure bars 19 may be moved positively outwards, or they may be spring loaded, or constituted by springs, and moved outwards as the result of the deformation to oval shape of the uppermost cups of the stack caused by the inward movement of the jaws 18.

This deformation of the cups causes the innermost cup 12 to be pressed against the suction faces 16 of the suction member and to be held against said faces by the suction applied to the orifices 17. The suction faces 16 have corrugations 20 corresponding to the corrugations in the cups.

The portion of the suction head 15 which enters the nest of cups is preferably made of rubber and is attached to the lower end of a metal tube (not shown) through which the suction is applied.

The jaws 18 are then moved outwardly to allow the deformed cups surrounding the innermost cup to resume their normal circular shape, this action being assisted by the inward return movement of the pressure bars 19 as shown in FIG. 3A. The suction head 15 then moves upwards, as shown in FIG. 3, to withdraw the innermost cup only, the jaws 18 meanwhile completing their outward movement. Inwardly directed lips 21 on the jaws 18 act to trap the cup 12A next to the cup 12 adhered to the suction member, in case the cup 12A should have any tendency to rise with the cup 12.

Having withdrawn the innermost cup, the suction head 15 continues its upward movement, the extracted cup being removed from the suction head after the vacuum has been cut off. If desired, the suction head may be given a lateral movement before the suction is cut off to deliver the extracted cup to a suitable receptacle. The suction head is then returned to the position shown in FIG. 1 and the cycle of operations repeated.

If desired and as shown in FIG. 4, the suction head may be provided in addition with bottom suction orifices 22 whereby suction may be applied to the base as well as the sides of the cup to be extracted.

In the modified construction shown in FIG. 6, the inner ends of the jaws 18 are formed with corrugations 18A corresponding with those of the cups.

FIGS. 7 and 8 illustrate in more detail a cup extracting apparatus which operates on the principles already described.

The nest of cups 12 is contained in a vertical tubular magazine 100. The jaws 18 and the pressure bars 19 are mounted to slide in guides 23 on a base plate 24 and are actuated by a ring cam 25, located by rollers 25A and having an actuating handle 26. When the handle 26 is moved to the position C, the jaws 18 are moved positively in by the cam 25, as shown in FIG. 8, and the pressure bars 19 are forced out by the cups. On movement of the handle 26 to the position D the pressure bars 19 are moved positively in by the cam 25 and the return of the cups to their initial shape moves the jaws 18 outwardly. Return springs may, however, be provided for the jaws 18 and pressure bars 19 if desired.

The cups 12 are urged upwardly in the magazine 100 by a plunger 27 loaded by a compression spring 28. A fresh nest of cups may be introduced into the magazine by removing a bottom closure cap 29, the spring 28 and the plunger 27. Alternatively, the fresh nest of cups can be introduced into the magazine from the top by springing it past the jaws 18.

The tube 31 supporting the suction head 15 is connected by a flexible pipe 32 to a valve housing 33 connected to a vacuum service line 34 and having a vent 35 to atmosphere. The valve (not shown) in the housing 33 is controlled by a plunger 36 which is normally held depressed by a spring 37. Vacuum is then applied to the suction head 15.

The tube 31 is supported by a pair of parallel arms 38 pivoted at 39 to a pillar 40. The upper arm 38 is connected by a crank 41 and a link 42 to a bell crank 47 pivoted on the pillar 40. By swinging a handle 44 from the position E to the position F, the suction head 15 may be raised from the nest of cups and moved to a position to deliver the extracted cup 12 into a pocket 45 in an intermittently moving conveyor 46. On return of the handle 44 to position E, the suction head 15 is moved back into the nest of cups. When the handle 44 approaches the position F, the bell crank 47, as shown in chain dotted lines, contacts the plunger 36, lifting it and causing the valve in the housing 33 to vent the interior of the tube 31 to atmosphere, so freeing the extracted cup from the suction head.

The cycle of operations is thus as follows:

(1) With the handle 26 in position D, move the handle 44 from position F to position E. This frees the plunger 36 from the arm 47, applying suction to the suction head 15, and moves the suction head into the nest of cups in the magazine.

(2) Move the handle 26 to position C, to deform the cups and effect adhesion of the innermost cup to the suction head.

(3) Return the handle 26 to position D, allowing all cups except the innermost one to resume their normal shape.

(4) Move the handle 44 to position F, to extract the cup and deposit it in a pocket 45 in the conveyor 46. As the result the suction is cut off by lifting of the plunger 36 as already explained.

As will be readily understood, movement of the ring cam 25 and of the suction head 15 to their alternative positions may be effected automatically by suitable cams, instead of manually, as shown in FIG. 7.

What I claim as my invention and desire to secure by Letters Patent is:

1. Apparatus for extracting individually and in succession pleated cups from a nest of such cups, comprising a holder for the nest of cups, a suction head having parallel opposite side faces with suction orifices formed therein, means for moving the suction head into and out of the nest, a pair of opposed jaws positioned upon said holder, a pair of opposed pressure bars on said holder spaced at 90° in relation to said jaws, alternately operative means for actuating said jaws and pressure bars to move them inwardly respectively in timed relationship and for permitting their alternate outward movement, said jaws when moved inwardly being operative to deform the cups to oval shape and to press the innermost said cup against said opposite side faces of the suction head, while the pressure bars are permitted to move outwardly with the correspondingly outwardly deformed portions of the cups, said pressure bars when moved inwardly in engagement with the cups then being operative to restore the deformed cups except for said innermost cups to their normal configuration, while the jaws are permitted to move outwardly with the portions of the cups engaged by them.

2. Apparatus as defined in claim 1 in which said alternately operative means comprises a cam having pairs of cam surfaces positioned for alternate actuating engagement with the said jaws and the said pressure bars respectively.

References Cited in the file of this patent

UNITED STATES PATENTS

| 2,777,602 | Genich | Jan. 15, 1957 |
| 2,937,786 | Muller | May 24, 1960 |
| 2,976,659 | Flanagan et al. | Mar. 28, 1961 |

FOREIGN PATENTS

| 544,164 | Belgium | Jan. 31, 1956 |